(12) United States Patent
Dang (10) Patent No.: US 7,756,351 B2
(45) Date of Patent: Jul. 13, 2010

(54) LOW POWER, HIGH PERFORMANCE TRANSFORM COPROCESSOR FOR VIDEO COMPRESSION

(75) Inventor: Philip P. Dang, San Diego, CA (US)

(73) Assignee: STMicroelectronics, Inc., Carrollton, TX (US)

(*) Notice: Subject to any disclaimer, the term of this patent is extended or adjusted under 35 U.S.C. 154(b) by 1547 days.

(21) Appl. No.: 10/975,638

(22) Filed: Oct. 28, 2004

(65) Prior Publication Data
US 2005/0141776 A1 Jun. 30, 2005

Related U.S. Application Data

(60) Provisional application No. 60/531,489, filed on Dec. 19, 2003.

(51) Int. Cl.
*G06K 9/36* (2006.01)
*G06F 17/14* (2006.01)

(52) U.S. Cl. ...................... 382/250; 708/402
(58) Field of Classification Search ......... 382/232–236, 382/239–250; 708/401, 402; 375/240.05
See application file for complete search history.

(56) References Cited

U.S. PATENT DOCUMENTS

| | | | |
|---|---|---|---|
| 4,791,598 A * | 12/1988 | Liou et al. | 708/402 |
| 5,523,847 A | 6/1996 | Feig et al. | |
| 6,185,595 B1 | 2/2001 | Hori et al. | |
| 7,076,105 B2 * | 7/2006 | Lee | 382/233 |
| 2002/0124035 A1 | 9/2002 | Faber et al. | |
| 2003/0099291 A1 * | 5/2003 | Kerofsky | 375/240.05 |

FOREIGN PATENT DOCUMENTS

WO    WO 03/019787 A2    3/2003

OTHER PUBLICATIONS

Trac D. Tran, "The BinDCT: Fast Multiplierless Approximation of the DCT", IEEE Signal Processing Letters, vol. 7, No. 6, Jun. 2000, pp. 141-144.

Jie Liang et al. "Fast Multiplierless Approximations of the DCT with the Lifting Scheme", IEEE Transactions on Signal Processing, vol. 49, No. 12, Dec. 2001, pp. 3032-3044.

Henrique S. Malvar, "Fast Computation of the Discrete Cosine Transform and the Discrete Hartley Transform", IEEE Transactions on Acoustics, Speech, and Signal Processing, vol. ASSP-35, No. 10, Oct. 1987, pp. 1484-1485.

Henrique S. Malvar et al., "Low-Complexity Transform and Quantization in H.264/AVC", IEEE Transactions on Circuits and Systems for Video Technology, vol. 13, No. 7, Jul. 2003, pp. 598-603.

(Continued)

*Primary Examiner*—Duy M Dang
(74) *Attorney, Agent, or Firm*—Lisa K. Jorgenson; William A. Munck (57) ABSTRACT

First and second integer transform matrices can be used to approximate the discrete cosine transform. An input matrix of data is multiplied by a first transform matrix of integers to produce an intermediate matrix of data. The intermediate matrix is multiplied by a second transform matrix of integers to produce a transform result matrix of data. The multiplications by the first and second transform matrices can be pipelined to increase throughput. A plurality of transform data paths can also be provided in parallel to increase throughput.

21 Claims, 5 Drawing Sheets

OTHER PUBLICATIONS

Thomas Wiegand et al., "Overview of the H.264/AVC Video Coding Standard", IEEE Transactions on Circuits and Systems for Video Technology, vol. 13, No. 7, Jul. 2003, pp. 560-576.

ARM Limited, ARM946E-S Technical Reference Manual, 2001.

European Search Report dated Feb. 27, 2009 in connection with European Patent Application No. EP 04 25 7767.

* cited by examiner $$H = \begin{bmatrix} c_2 & c_2 & c_2 & c_2 \\ c_1 & c_3 & -c_3 & -c_1 \\ c_2 & -c_2 & -c_2 & c_2 \\ c_3 & -c_1 & c_1 & -c_3 \end{bmatrix}$$

*FIG. 1*
(PRIOR ART)

$$K = [\alpha H] = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \overset{\curvearrowleft}{\phantom{x}} 21$$

*FIG. 2*
(PRIOR ART)

$$\begin{bmatrix} Y[0] \\ Y[1] \\ Y[2] \\ Y[3] \end{bmatrix} = \underset{21}{\begin{bmatrix} 1 & 1 & 1 & 1 \\ 2 & 1 & -1 & -2 \\ 1 & -1 & -1 & 1 \\ 1 & -2 & 2 & -1 \end{bmatrix}} \begin{bmatrix} x[0] \\ x[1] \\ x[2] \\ x[3] \end{bmatrix}$$

*FIG. 3*
(PRIOR ART)

$$\underset{21}{\begin{bmatrix} 1 & 1 & 1 & 1 \\ 2 & 1 & -1 & -2 \\ 1 & -1 & -1 & 1 \\ 1 & -2 & 2 & -1 \end{bmatrix}} = \underset{42}{\begin{bmatrix} 1 & 1 & 0 & 0 \\ 0 & 0 & 1 & 2 \\ 1 & -1 & 0 & 0 \\ 0 & 0 & -2 & 1 \end{bmatrix}} \underset{41}{\begin{bmatrix} 1 & 0 & 0 & 1 \\ 0 & 1 & 1 & 0 \\ 0 & 1 & -1 & 0 \\ 1 & 0 & 0 & -1 \end{bmatrix}}$$

$$\begin{bmatrix} b_{00} & b_{01} & b_{02} & b_{03} \\ b_{10} & b_{11} & b_{12} & b_{13} \\ b_{20} & b_{21} & b_{22} & b_{23} \\ b_{30} & b_{31} & b_{32} & b_{33} \end{bmatrix} = \begin{bmatrix} 1 & 1 & 0 & 0 \\ 0 & 0 & 1 & 2 \\ 1 & -1 & 0 & 0 \\ 0 & 0 & -2 & 1 \end{bmatrix} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}$$

$\quad\quad\quad\quad 52 \quad\quad\quad\quad\quad\quad\quad 42 \quad\quad\quad\quad\quad\quad 41 \quad\quad\quad\quad\quad\quad 51$

FIG. 6

STAGE 1
$$\begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{bmatrix} = \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} x_{00} & x_{01} & x_{02} & x_{03} \\ x_{10} & x_{11} & x_{12} & x_{13} \\ x_{20} & x_{21} & x_{22} & x_{23} \\ x_{30} & x_{31} & x_{32} & x_{33} \end{bmatrix}$$

$\quad\quad\quad\quad\quad 61 \quad\quad\quad\quad\quad\quad\quad 41 \quad\quad\quad\quad\quad\quad 51$

FIG. 7

STAGE 2
$$\begin{bmatrix} b_{00} & b_{01} & b_{02} & b_{03} \\ b_{10} & b_{11} & b_{12} & b_{13} \\ b_{20} & b_{21} & b_{22} & b_{23} \\ b_{30} & b_{31} & b_{32} & b_{33} \end{bmatrix} = \begin{bmatrix} 1 & 1 & 0 & 0 \\ 0 & 0 & 1 & 2 \\ 1 & -1 & 0 & 0 \\ 0 & 0 & -2 & 1 \end{bmatrix} \begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{30} & a_{31} & a_{32} & a_{33} \end{bmatrix}$$

$\quad\quad\quad\quad\quad 52 \quad\quad\quad\quad\quad\quad\quad 42 \quad\quad\quad\quad\quad\quad 61$

| CYCLE | STAGE 2 | STAGE 1 |
|---|---|---|
| 5 | $b_{03}, b_{13}, b_{23}, b_{33}$ | |
| 4 | $b_{02}, b_{12}, b_{22}, b_{32}$ | $a_{03}, a_{13}, a_{23}, a_{33}$ |
| 3 | $b_{01}, b_{11}, b_{21}, b_{31}$ | $a_{02}, a_{12}, a_{22}, a_{32}$ |
| 2 | $b_{00}, b_{10}, b_{20}, b_{30}$ | $a_{01}, a_{11}, a_{21}, a_{31}$ |
| 1 | | $a_{00}, a_{10}, a_{20}, a_{30}$ |

FIG. 12

LOW POWER, HIGH PERFORMANCE TRANSFORM COPROCESSOR FOR VIDEO COMPRESSION

PRIORITY CLAIM

This application claims the priority under 35 U.S.C. §119 (e) of co-pending U.S. Provisional Application No. 60/531,489, filed on Dec. 19, 2003 and incorporated herein by reference.

TECHNICAL FIELD

This disclosure is generally directed to data processing and more specifically to video compression processing.

BACKGROUND

The documents listed below are incorporated herein by reference.
[1]. T. Weigand, G. S. Sullivan, G. Bjontegaard, and A. Luthra, "Overview of the H.264/AVC Video Coding Standard," *IEEE Transaction on Circuits and Systems for Video Technology*, Vol. 13, No. 7, pp. 560-576, July 2003,
[2] Draft ITU-U Recommendation and Final Draft International Standard of Joint Video Specification (ITU-T Rec. H.264|ISO/IEC 14496-10 AVC), Geneva, Switzerland, May 2003.
[3]. N. Ahmed, T. Natarajan, and K. B. Rao, "Discrete Cosine Transform," *IEEE Transaction on Computers*, Vol. C-23, pp. 90-93, January 1974.
[4] H. S. Malvar "Low Complexity Length-4 Transform and Quantization with 16-bit Arithmetic" ITU-T SC 16, September 2001, Docs. VCEG-N43
[5] H. S. Malvar, A. Hallapuro, M. Karczewicz, and I., Kerofsky "Low Complexity Transform and Quantization in H.264/AVC" *IEEE Transaction on Circuits and Systems for Video Technology*, Vol. 13, No. 7, pp. 598-603, July 2003.
[6] H. Malvar, "Fast Computation of the Discrete Cosine Transform and the Discrete Hartley Transform," *IEEE Trans. on Acoustics, Speech and Signal Processing*, Vol. ASSP-35, No. 10, pp 1484-1485, October 1987.
[7] Y. Arai, T. Agui, and Nakajima, "A Fast DCT-SQ Scheme for Images," *Trans. of the IEICEE*, Vol. E71, No. 9, pp 1095-1097, November 1988.
[8] W. B. Pennebaker, J. L. Mitchel, *JPEG Still Image Compression Standard*, Van Nostrand Reinhold, New York (1992).
[9] T. D. Tran, "The BinDCT: Fast Multiplierless Approximation of the DCT," *IEEE Signal Processing Letter*, vol. 7, pp. 141-145, June 2000.
[10] J. Liang and T. D. Tran, "Fast Multiplierless Approximations Of The DCT With The Lifting Scheme," *IEEE Trans. on Signal Processing*, vol. 49, pp. 3032-3044, December 2001.
[11] Steve Furber, "ARM System-on-chip Architecture", Addison Wesley 2000.
[12] ARM Limited, ARM946-E-S Technical Reference Manual, 2001.

H.264/AVC is the latest video compression standard. It was developed by the Joint Video Team (JVT), which includes experts from the Video Coding Experts Group (VCEG) of the International Telecommunications Union (ITU-T) and the Moving Picture Experts Group (MPEG) from the International Organization for Standardisation (ISO) and the International Electrotechnical Commission (IEC). In ITU-T's documents, the formal name of the new video compression standard is ITU-T Recommendation H.264. The ISO/IEC called it the ISO/IEC 14496-10 Advanced Video Coding. For short reference, this new video compression standard is commonly referred as the H.264/AVC.

H.264/AVC has many applications, including: video broadcasting over cable, satellite and DSL; video-on-demand or multimedia streaming services; conversational services over ISDN, Ethernet, LAN, wireless and mobile networks; and interactive or serial storage on optical devices such as DVD.

The H.264/AVC was designed for higher coding efficiency. In order to obtain better compression, H.264/AVC standard adopted many advanced video coding techniques. For intra coding, H.264/AVC uses a directional spatial prediction scheme to find more redundancies among pixels within a video frame. For inter coding, H.264/AVC implements multiple frames reference, weighted prediction, de-blocking filter, variable block size and quarter sample accurate motion compensations. For transformation, H.264/AVC uses a small, block-based, integer, and hierarchical transform. For entropy coding, H.264/AVC adopts two different coding techniques. The context adaptive based arithmetic coding (CABAC) is selected for the main profile whereas the context adaptive variable length coding (CAVLC) is used for baseline, main and extended profiles. Three profiles of H.264/AVC support 15 levels. These levels specify sets of algorithms and parameters for a wide range of video applications.

Note that the integer transform of H.264/AVC has lower complexity than that of the Discrete Cosine Transform (DCT) in previous video compression standards. Fifteen levels of H.264/AVC, however, cover a wide range of video formats from SQCIF (128×96) to 16:9 (4096×2304). For real time video processing, the number of macroblocks that must be processed per second is very high and is not efficient for software implementation. For instance, to process 30 frames of CIF (352×288) video format in real time, an embedded processor must process 11,880 macroblocks, which requires 36,495,360 shift and add instructions. Without load, store and transposition operations, this complexity already costs more than 36 million instructions per second (MIPS). This computational complexity is high for most embedded applications. The 16:9 format has an even far greater computational complexity than CIF.

Figure 1:
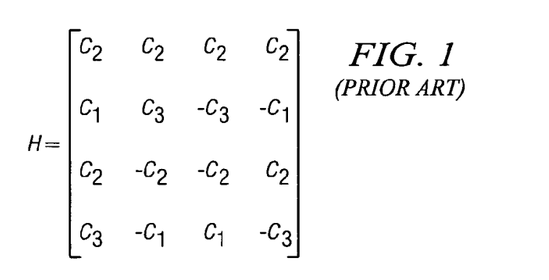
FIG. 1 illustrates a matrix for performing a 4×4 discrete cosine transform according to the prior art.

The Discrete Cosine Transform (DCT) is one of the most important transformations in image and video processing. It has been used in many compression standards which include JPEG, H.261, H.263, MPEG-1, MPEG-2, and MPEG-4. The DCT was first proposed by Ahmed, Natarajan, and Rao in 1974 (see document [3] above). Their landmark paper presents an N-point DCT that can be computed with a 2N-point FFT and some additional post-processing. The one-dimensional DCT can map a vector x of length N into a new vector z of transform coefficients by a linear transformation z=Hx, where H is an N×N matrix such as shown in FIG. 1, and where $C_1 mt;epmrl;\sqrt{½}rlxmx \cos(\pi/8)$, $C_2=mt;epmrl;\sqrt{½}rlxmx \cos(2\pi/8)$, and $C_3=mt;epmrl;\sqrt{½}rlxmx \cos(3\pi/8)$. Let X be a 4×4 input matrix, Y be a 4×4 output matrix, and $H^t$ be the transpose matrix of H. The two-dimensional (2-D) 4×4 forward DCT is then defined as $Y=HXH^t$.

A basic disadvantage of the 4×4 DCT is that the entries in H (FIG. 1) are irrational numbers. Hence, both the forward 4×4 DCT and the inverse 4×4 DCT require floating-point execution units. The floating-point implementation increases the hardware complexity of the coding system.

To resolve this problem, Malvar (see document [4] above) suggested a method that scales entries of the 4×4 DCT matrices to obtain integer operations. The output results are rescaled to obtain an approximation of 4×4 DCT. Malvar used the scaling factor $\alpha=2.5$ (see documents [4] and [5] above). The resulting scaled matrix K is shown at 21 in FIG. 2. FIG. 3 illustrates the use of the integer transform matrix 21 to perform a 4-point one-dimensional integer transform on a vector x.

The approximation of a two-dimensional 4×4 DCT is $Z=(KXK^t) \otimes S$ where Z is a 4×4 matrix, and S is a 4×4 rescaling matrix. The matrix S is typically incorporated into the quantization stage, which is usually implemented by lookup tables. Therefore, the approximation of a two-dimensional 4×4 DCT can be implemented completely by integer operations. With the matrix S incorporated into the quantization stage, the two-dimensional 4×4 integer transform is $W=KXK^t$.

In view of the computational complexities associated even with integer transform processing of the various video formats supported by H.264/AVC, it is desirable to provide for integer transform processing with reduced computational complexity.

SUMMARY

Exemplary embodiments of the invention utilize first and second integer transform matrices to approximate the discrete cosine transform. An input matrix of data is multiplied by a first transform matrix of integers to produce an intermediate matrix of data. The intermediate matrix is multiplied by a second transform matrix of integers to produce a transform result matrix of data. The multiplications by the first and second transform matrices can be pipelined to increase throughput. A plurality of transform data paths can also be provided in parallel to increase throughput.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the Detailed Description of the Invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 5 illustrates an exemplary implementation of the FIG. 4 factoring according to the invention;

FIG. 6 illustrates a first stage matrix multiplication operation of the FIG. 5 implementation according to exemplary embodiments of the invention;

FIG. 7 illustrates a second stage matrix multiplication operation of the FIG. 5 implementation according to exemplary embodiments of the invention;

DETAILED DESCRIPTION

FIGS. 1 through 13, discussed below, and the various embodiments used to describe the principles of the present invention in this patent document are by way of illustration only and should not be construed in any way to limit the scope of the invention. Those skilled in the art will understand that the principles of the present invention may be implemented relative to any suitable data processing application.

Figure 2:
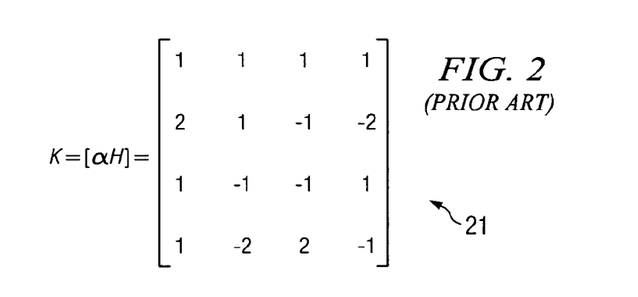
FIG. 2 illustrates a scaled and round-off version of the matrix of FIG. 1 for performing an integer approximation to the discrete cosine transform of FIG. 1 according to the prior art.
Figure 3:
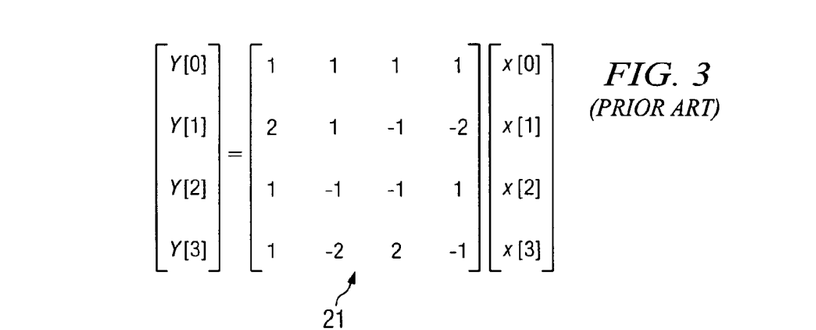
FIG. 3 illustrates the use of the matrix of FIG. 2 according to the prior art.
Figure 4:
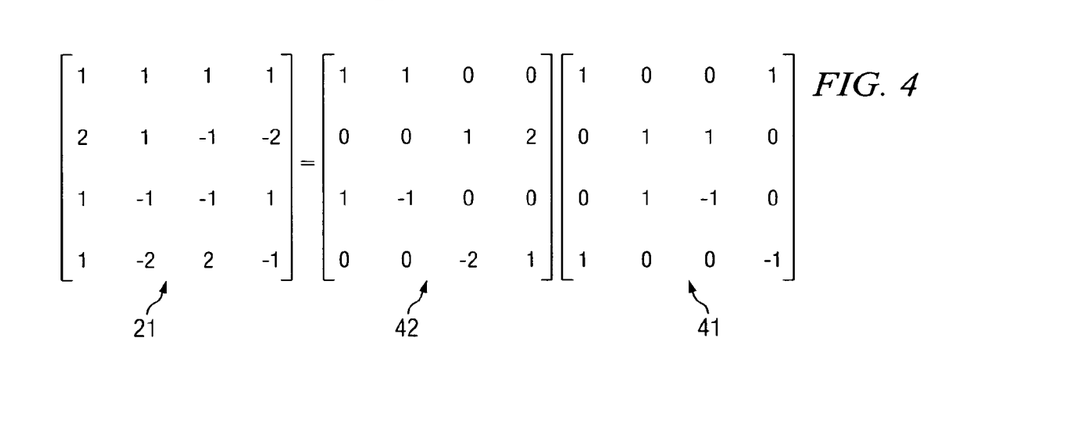
FIG. 4 illustrates factoring of the matrix of FIGS. 2 and 3 according to exemplary embodiments of the invention.

FIG. 4 illustrates factoring of the integer transform matrix 21 of FIGS. 2 and 3 according to exemplary embodiments of the invention. In FIG. 4, the integer transform matrix 21 is factored into constituent transform matrices 41 and 42 which, when multiplied together, produce the matrix 21. Considering again the 4-point one dimensional integer transform illustrated in FIG. 3, that transform requires twelve addition operations and four multiplication (typically data shift) operations. This means that a 4×4 one dimensional integer transform using the matrix 21 of FIG. 3 would require 48 addition operations and 16 shift operations, and a 4×4 two dimensional integer transform using the matrix 21 of FIG. 3 would require 96 addition operations and 32 shift operations.

However, if the integer transform operation is performed using the constituent factor transform matrices 41 and 42 of FIG. 4, then a 4 point one dimensional integer transform operation of the type illustrated in FIG. 3 can be performed with only 8 addition operations and 2 multiplication (shift) operations. This means that a 4×4 one dimensional integer transform operation can be performed with 32 addition operations and 8 shift operations, and a 4×4 two dimensional integer transform operation can be performed with 64 addition operations and 16 shift operations.

FIG. 5 illustrates an exemplary implementation of the constituent factor transform matrices 41 and 42 of FIG. 4 according to the invention. In FIG. 5, the transform matrices 41 and 42 are used to perform a 4×4 one dimensional integer transform on a matrix 51 of input data, in order to produce a 4×4 transform result matrix 52. The data components of input matrix 51 are designated by $x_{rj}$ in FIG. 5 where r and j are the respective row and column indices of the matrix 51, and where r and j can each take the values 0, 1, 2 and 3. The data components of the transform result matrix 52 are designated as $b_{rj}$ in FIG. 5, where r and j are the same respective row and column indices as described above with respect to matrix 51.

FIG. 6 illustrates a first stage (stage 1) integer transform operation associated with the implementation of FIG. 5. In the example of FIG. 6, the transform matrix 41 is used as a first stage transform matrix and is multiplied by the input data matrix 51 to produce an intermediate data matrix 61 whose components are designated as $a_{rj}$, where r and j are the same respective row and column indices as described above with respect to matrices 51 and 52.

FIG. 7 illustrates a second stage (stage 2) integer transform operation associated with the implementation of FIG. 5. In FIG. 7, the matrix 42 is used as a second stage transform matrix and is multiplied by the intermediate matrix 61 in order to produce the transform result matrix 52 (see also FIG. 5).

Figure 8:
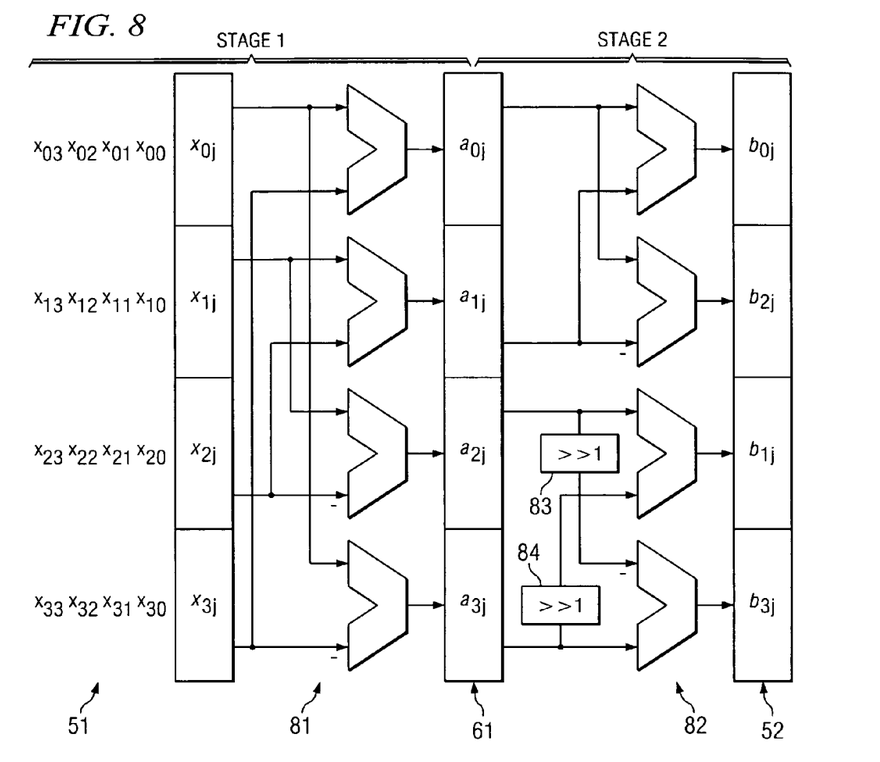
FIG. 8 diagrammatically illustrates exemplary embodiments of a data processing apparatus which can perform the first and second stage matrix multiplication operations of FIGS. 6 and 7 according to the invention.

FIG. 8 diagrammatically illustrates exemplary embodiments of a data processing apparatus which can perform the first and second stage operations described above with respect to FIGS. 6 and 7. The apparatus of FIG. 8 includes a matrix multiplication apparatus having a matrix multiplier 81 which performs the first stage matrix multiplication operation illustrated in FIG. 6, and having a matrix multiplier 82 which performs the second stage matrix multiplication operation illustrated in FIG. 7. As shown in FIG. 8, the first stage matrix multiplier 81 receives the data from the input data matrix 51 and performs the arithmetic operations necessary to produce the intermediate data matrix 61 (see also FIG. 6). In particular, the matrix multiplier 81 includes four adders connected appropriately, and with necessary inversions, to perform the four addition operations required to implement the matrix multiplication equation of FIG. 6. The matrix multiplier 82 receives the data from the intermediate matrix 61 and performs the arithmetic operations necessary to produce the transform result matrix 52 (see also FIG. 7). The matrix multiplier 82 includes four adders connected appropriately, and with necessary inversions and shifters, to perform the four addition operations and two shift operations required to implement the matrix multiplication equation of FIG. 7. Data shifters 83 and 84 each perform a single left shift (multiply by 2) operation in order to implement the two multiplication operations required by the equation of FIG. 7.

Figure 9:
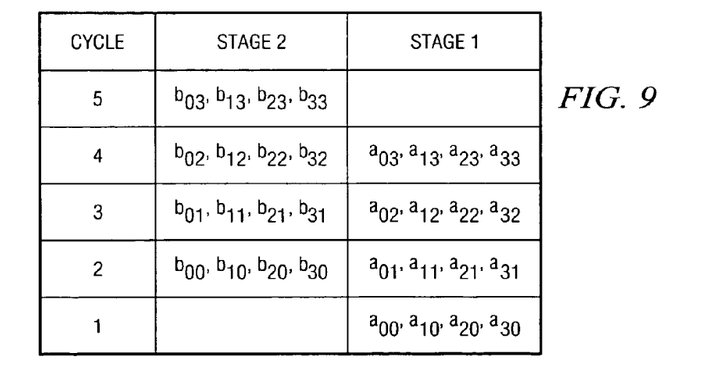
FIG. 9 illustrates in tabular format the timing of exemplary operations which can be performed by the data processing apparatus of FIG. 8.

FIG. 9 illustrates in tabular format the timing of exemplary operations which can be performed by the data processing apparatus of FIG. 8. In particular, and referring also to FIGS. 6 and 7, FIG. 9 shows that the data processing apparatus of FIG. 8 can produce each column of the matrix 61 of FIG. 6 in a single clock cycle, and can also produce each column of the matrix 52 of FIG. 7 in a single clock cycle. That is, the adders of the matrix multiplier 81 can effectuate a multiplication of all four rows of the transform matrix 41 by any given column of the input matrix 51 in a single clock cycle, and the adders of the matrix multiplier 82, together with shifters 83 and 84, can effectuate multiplication of all four rows of matrix 42 by any given column of matrix 61 in a single clock cycle. Therefore, during clock cycle 2, after the first stage matrix multiplier 81 has already produced the first column of intermediate matrix 61 during clock cycle 1, the second stage matrix multiplier 82 can use the first column of the intermediate matrix 61 to produce the first column of the transform result matrix 52. Thus, during clock cycle 1 of FIG. 9, the matrix multiplier 81 produces the first column (column 0) of the intermediate matrix 61. Thereafter, during clock cycle 2 of FIG. 9, while the matrix multiplier 81 is producing the second column (column 1) of the intermediate matrix 61, the second stage matrix multiplier 82 is simultaneously using the already-produced first column of intermediate matrix 61 to produce the first column of the transform result matrix 52.

Thus, the operations of the matrix multipliers 81 and 82 can be pipelined as shown in FIG. 9 in order to produce the complete transform result matrix 52 of FIG. 7 in five clock cycles. So the data processing apparatus of FIG. 8 can perform a 4×4 one dimensional integer transform in five clock cycles. As indicated by FIG. 9, during clock cycle 5, while the second stage matrix multiplier 82 is producing the fourth column (column 3) of the transform result matrix 52 of FIG. 7, the first stage matrix multiplier 81 can be simultaneously operating on a subsequent input data matrix 51 to produce the first column of a subsequent intermediate data matrix 61 (see also FIG. 6).

Figure 10:
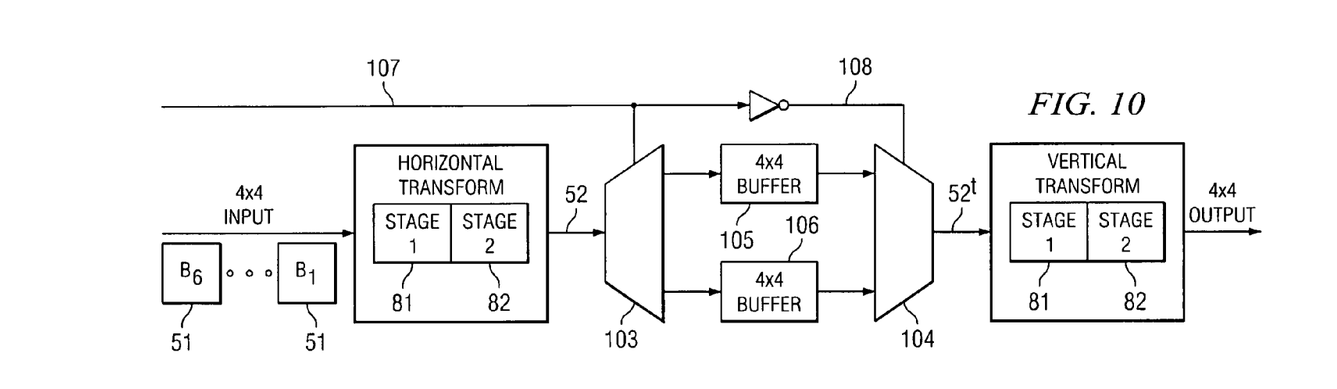
FIG. 10 diagrammatically illustrates exemplary embodiments of a data processing apparatus which can perform two-dimensional transform operations according to the invention.

FIG. 10 diagrammatically illustrates exemplary embodiments of a data processing apparatus which can perform a 4×4 two dimensional integer transform according to the invention. In the example of FIG. 10, the architecture of FIG. 8 is used to perform a horizontal transform HT and is also used to perform a vertical transform VT. In the matrix multiplication apparatus illustrated in FIG. 10, the horizontal transform portion HT performs the operations illustrated in FIG. 8 to produce the transform result matrix 52. This transform result matrix 52 is then stored in one of two buffers 105 and 106, as selected by a selector 103 under control of a control signal 107. A further selector 104 under control of a control signal 108 provides the content of one of buffers 105 and 106 to the vertical transform portion VT. In some embodiments, the buffers 105 and 106 can be read such that the data from the buffered transform result matrix 52 is provided to the vertical transform portion VT on a row-by-row basis, so the vertical transform portion VT operates on the transpose of the buffered transform result matrix 52. This effective transposing of the buffered transform result matrix 52 is illustrated in FIG. 10 by the use of the reference character $52^t$. Transposition of the result matrix produced by horizontal transform portion HT permits the vertical transform portion VT to perform the transform in the second dimension.

Figure 11:
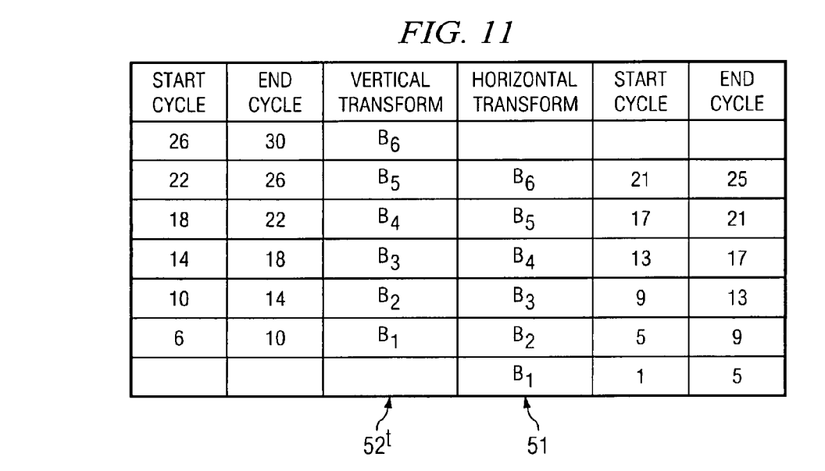
FIG. 11 illustrates in tabular format the timing of exemplary operations which can be performed by the data processing apparatus of FIG. 10.

FIG. 11 illustrates in tabular format the timing of exemplary operations which can be performed by the data processing apparatus of FIG. 10. In clock cycle 5, the horizontal transform portion HT completes its operation on the first 4×4 input data matrix 51 (also designated as $B_1$), and stage 1 of the HT portion has also already begun operation on the second 4×4 input data matrix 51 (also designated as $B_2$). Because the horizontal transform portion finishes producing the first transform result matrix 52 during clock cycle 5, this means the vertical transform portion VT can begin operations on the transpose 52$^t$ of the first transform result matrix 52 during clock cycle 6. The correspondence of the transposed transform result matrices 52$^t$ to the input data matrices 51 is illustrated in FIG. 11 by maintaining corresponding subscript numbers on the designators B.

In FIG. 10, the selectors 103 and 104 are controlled by logically complementary control signals 107 and 108 such that the vertical transform portion VT is never accessing the buffer to which the horizontal transform portion HT is writing. As shown in FIG. 11, while the vertical transform portion VT is processing the transposed transform result matrix 52$^t$/$B_1$ associated with the first input matrix 51/$B_1$, the horizontal transform portion HT is simultaneously processing data from the second input data matrix 51/$B_2$ in the sequence of input data matrices. The horizontal transform portion HT can complete its operation on a sequence of six 4×4 input matrices in 25 clock cycles and, by virtue of the pipelining illustrated in FIG. 11, the complete two dimensional transform of a sequence of six 4×4 input data matrices is completed in thirty clock cycles.

The output of the vertical transform portion VT in FIG. 10 can be provided to a conventional quantization stage for conventional rescaling and quantizing.

Figure 12:
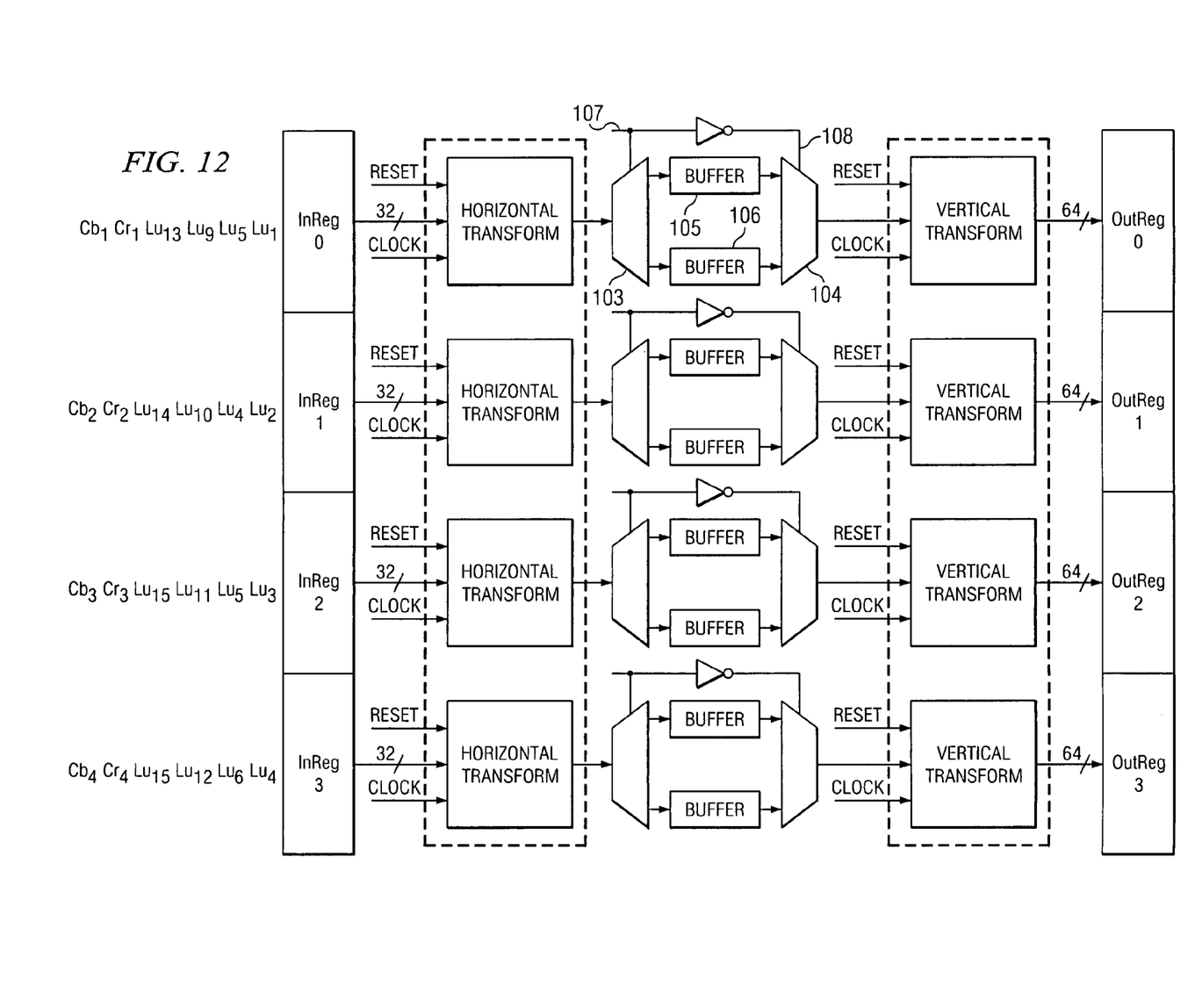
FIG. 12 diagrammatically illustrates exemplary embodiments of a data processing apparatus which can perform a plurality of two-dimensional transforms in parallel according to the invention.

FIG. 12 diagrammatically illustrates exemplary embodiments of a data processing apparatus which can perform a plurality of 4×4 two-dimensional integer transforms in parallel according to the invention. The example of FIG. 12 generally uses four instances of the architecture of FIG. 10, arranged in parallel. Therefore, the apparatus of FIG. 12 can perform two dimensional transform processing on 24 4×4 input matrices in thirty clock cycles (see also FIG. 11). The twenty four 4×4 input data blocks illustrated in the example of FIG. 12 are the well-known constituent blocks of a conventional H.264/AVC macroblock. Each of the four 32-bit input registers can hold four 8-bit input pixels.

Figure 13:
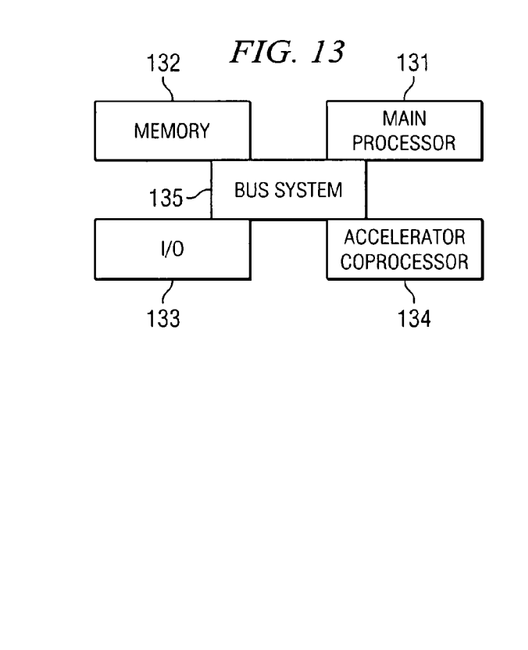
FIG. 13 diagrammatically illustrates a data processing system according to exemplary embodiments of the invention.

FIG. 13 diagrammatically illustrates exemplary embodiments of a data processing system according to the invention. The system of FIG. 13, for example a high definition television system or a digital cinema system, includes a main processor 131, a memory portion 132, a user interface (I/O) 133 and an accelerator coprocessor 134. These components are interconnected by a bus system 135. In various embodiments, the accelerator coprocessor 134 can implement the various exemplary integer transform architectures described above with respect to FIGS. 8-12. In some exemplary embodiments, the main processor 131 and the coprocessor 134 implement respective pipelines. The coprocessor 134 receives instructions from the main processor 131, and uses a pipeline follower to determine what instruction it must execute. To avoid congestion in the critical path, in some embodiments the coprocessor pipeline operates one clock cycle behind the main processor pipeline. After receiving a given instruction, the coprocessor loads data from the memory and performs the necessary transform operations.

In some exemplary embodiments, the main processor 131 is an ARM946E-S processor, the system memory portion 132 includes 512 kilobytes of SRAM and 4 megabytes of SDRAM, and the bus system 135 is a conventional high speed AMBA bus system for increased data throughput between the main processor 131, the coprocessor 134 and the system memory 132.

Referring again to the exemplary architecture of FIG. 12, the hardware cost of the illustrated architecture is low. It requires four 32-bit registers, four 64-bit registers, 16 multiplexers, 32 adders and 256 bytes of buffer memory. The small buffer memory is implemented with D flip-flops in some embodiments. In one example using 0.18 μm CMOS technology, the footprint of the FIG. 12 architecture is only 0.0838 mm$^2$. Even with this small footprint, the architecture still provides sufficient computing power for real time video processing. At a 10 MHz clock rate, for example, the architecture can compute integer transforms for 2K×1K (2048×1024) format at 30 frames per second. For high definition video applications using 16:9 format (4096×2034) running at 60 frames per second, the architecture requires 66,355,200 clock cycles, which is equivalent to 67 MHz. The design of the architecture can be scaled to meet this real time constraint.

Note that the average power consumption of a CMOS gate due to the switching current is given by $P=\alpha C_L V_{dd}^2 f$, where f is the system clock frequency, $V_{dd}$ is the supply voltage, $C_L$ is the load capacitance, and α is the switching activity. In one example of the architecture of FIG. 12, the clock rate is 10 MHz, the global voltage is 1.55 V, and the load capacitance is 1 pf. The switching power reported by a hardware simulation for this example is 529 μW.

Besides the compact area and low power consumption, exemplary embodiments of the invention require only a small data range. From FIGS. 5-7, the data range at the output of each stage can be easily determined. In the worst case, and assuming 8-bit pixel inputs, the outputs of the first dimensional transform (e.g. HT in FIGS. 10 and 12) are 11 bits and the outputs of the second dimensional transform (e.g. VT in FIGS. 10 and 12) are 14 bits. Hence, a 4×4 two-dimensional integer transform can be implemented with a 14-bit wide data path.

As demonstrated above, exemplary embodiments of the invention introduce a method and an apparatus to reduce computational complexity and increase the throughput of the integer transform in H.264 video compression standard. The method factors the integer transform matrix into two integer matrices with less computations. In addition, this approach also allows the integer transform be calculated in two steps, which is well suited for pipeline architecture.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for calculating integer transforms of input matrices of data, comprising:
    an input for receiving input matrices of data;
    a matrix multiplication apparatus coupled to said input;
    said matrix multiplication apparatus including a first matrix multiplier for multiplying a first input matrix of data by a first transform matrix of integers to produce a first intermediate matrix of data;
    said matrix multiplication apparatus including a second matrix multiplier coupled to said first matrix multiplier for multiplying the first intermediate matrix by a second transform matrix of integers to produce a first transform result matrix of data; and
    a further said matrix multiplication apparatus coupled to said input for operation in parallel with said first-mentioned matrix multiplication apparatus, wherein said matrix multiplication apparatus includes a third matrix multiplier coupled to said second matrix multiplier for multiplying a transpose of the first transform result matrix by the first transform matrix to produce a second intermediate matrix of data and a fourth matrix multiplier coupled to said third matrix multiplier for multiplying the second intermediate matrix by the second transform matrix to produce a two-dimensional result matrix.

2. The apparatus of claim 1, wherein said first matrix multiplier is further for multiplying a second input matrix of data by the first transform matrix to produce a second intermediate matrix of data while said second matrix multiplier is simultaneously multiplying the first intermediate matrix by the second transform matrix.

3. The apparatus of claim 1, wherein said second matrix multiplier is for producing a second said transform result matrix of data, said third matrix multiplier is further for multiplying a transpose of said second transform result matrix by the first transform matrix to produce a third intermediate matrix of data while said fourth matrix multiplier is simultaneously multiplying the second intermediate matrix by the second transform matrix, and wherein said first matrix multiplier is for multiplying a second input matrix of data by the first transform matrix to produce a fourth intermediate matrix of data while said second matrix multiplier is simultaneously multiplying the first intermediate matrix by the second transform matrix.

4. The apparatus of claim 3, including a further said matrix multiplication apparatus coupled to said input for operation in parallel with said first-mentioned matrix multiplication apparatus.

5. The apparatus of claim 1, including a further said matrix multiplication apparatus coupled to said input for operation in parallel with said first-mentioned matrix multiplication apparatus.

6. The apparatus of claim 1, wherein said data is H.264 video data.

7. A video data processing system, comprising:
a video data processor including an input for receiving input matrices of data, and a transform apparatus coupled to said input for calculating integer transforms of said input matrices of data, said transform apparatus including a first matrix multiplier for multiplying a first input matrix of data by a first transform matrix of integers to produce a first intermediate matrix of data, and said transform apparatus including a second matrix multiplier coupled to said first matrix multiplier for multiplying the first intermediate matrix by a second transform matrix of integers to produce a first transform result matrix of data, wherein said transform apparatus includes a third matrix multiplier coupled to said second matrix multiplier for multiplying a transpose of the first transform result matrix by the first transform matrix to produce a second intermediate matrix of data, and said matrix multiplication apparatus including a fourth matrix multiplier coupled to said third matrix multiplier for multiplying the second intermediate matrix by the second transform matrix to produce a two-dimensional result matrix; and
an interface coupled to said video data processor for permitting a user to communicate with said video data processor.

8. The system of claim 7, including a further data processor coupled to said video data processor for controlling operation of said video data processor.

9. The system of claim 7, provided as one of a high definition television system and a digital cinema system.

10. The system of claim 7, wherein said data is H.264 video data.

11. A method of calculating integer transforms of input matrices of data, comprising:
storing a first input matrix of data and a first transform matrix of integers into a memory;
multiplying the first input matrix of data by the first transform matrix of integers to produce a first intermediate matrix of data, wherein the multiplication of the first input matrix of data by the first transform matrix of integers is preformed by at least one processor;
multiplying the first intermediate matrix by a second transform matrix of integers to produce a first transform result matrix of data; and
storing the first transform result matrix of data into the memory, wherein the method includes multiplying a third input matrix of data by the first transform matrix to produce a second intermediate matrix of data while multiplying the first input matrix by the first transform matrix, and multiplying the second intermediate matrix by the second transform matrix to produce a second transform result matrix of data while multiplying the first intermediate matrix by the second transform matrix.

12. The method of claim 11, including multiplying a second input matrix of data by the first transform matrix to produce a second intermediate matrix of data while simultaneously multiplying the first intermediate matrix by the second transform matrix.

13. The method of claim 12, wherein the second input matrix follows the first input matrix in a first received sequence of input matrices of data.

14. The method of claim 13, including multiplying the third input matrix of data by the first transform matrix to produce a third intermediate matrix of data while simultaneously multiplying the first input matrix by the first transform matrix, multiplying the third intermediate matrix by the second transform matrix to produce a second transform result matrix of data while simultaneously multiplying the first intermediate matrix by the second transform matrix, and multiplying a fourth input matrix of video data by the first transform matrix to produce a fourth intermediate matrix of data while simultaneously multiplying the third intermediate matrix by the second transform matrix and also while simultaneously multiplying the second input matrix by the first transform matrix and also while simultaneously multiplying the first intermediate matrix by the second transform matrix.

15. The method of claim 14, wherein the fourth input matrix follows the third input matrix in a second received sequence of input matrices of data provided in parallel with the first sequence of input matrices of data.

16. The method of claim 11, including multiplying a transpose of the first transform result matrix by the first transform matrix to produce a second intermediate matrix of data, and multiplying the second intermediate matrix by the second transform matrix to produce a two-dimensional transform result matrix.

17. The method of claim 16, including performing said matrix multiplying steps with respect to a second input matrix of data to produce a second transform result matrix of data, multiplying a transpose of the second transform result matrix by the first transform matrix to produce a third intermediate matrix of data while simultaneously multiplying the second intermediate matrix by the second transform matrix, and said performing step including multiplying the second input matrix by the first transform matrix to produce a fourth intermediate matrix of data while simultaneously multiplying the first intermediate matrix by the second transform matrix.

18. The method of claim 11, wherein each of said matrix multiplying steps includes a plurality of arithmetic operations consisting of (a) adding eight pairs of addends to produce eight respectively corresponding sums, and (b) multiplying two pairs of factors to produce two respectively corresponding products.

19. The method of claim 18, wherein said step of multiplying two pairs of factors includes performing a shift operation on a digital representation of one of the factors of each of said two pairs of factors.

20. The method of claim 11, wherein all of said matrices are 4×4 matrices.

21. The method of claim 11, wherein said data is H.264 video data.

* * * * *